(12) United States Patent
Ko

(10) Patent No.: US 8,320,061 B2
(45) Date of Patent: Nov. 27, 2012

(54) LENS SYSTEM HAVING WIDE-ANGLE, HIGH RESOLUTION, AND LARGE APERTURE

(75) Inventor: Chun-Cheng Ko, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 97 days.

(21) Appl. No.: 12/949,821

(22) Filed: Nov. 19, 2010

(65) Prior Publication Data

US 2012/0113529 A1   May 10, 2012

(30) Foreign Application Priority Data

Nov. 9, 2010   (TW) ................................ 99138419 A

(51) Int. Cl.
*G02B 9/34* (2006.01)

(52) U.S. Cl. ........................................ 359/773; 359/715

(58) Field of Classification Search .................. 359/708, 359/713–715, 754–757, 763, 764, 766, 771–773
See application file for complete search history.

(56) References Cited

U.S. PATENT DOCUMENTS

| | | | | |
|---|---|---|---|---|
| 7,012,765 | B2 * | 3/2006 | Matsui et al. | 359/771 |
| 7,061,694 | B2 * | 6/2006 | Amanai | 359/773 |
| 7,633,690 | B2 * | 12/2009 | Yasuhiko | 359/773 |

* cited by examiner

*Primary Examiner* — Darryl J Collins
(74) *Attorney, Agent, or Firm* — Altis Law Group, Inc.

(57) ABSTRACT

A lens system, in the order from the subject side to the image side thereof, includes an aperture stop, a first lens of positive refractive power, a second lens of negative refractive power, a third lens of positive refractive power, and a fourth lens of negative refractive power. The image lens satisfies the formulae: G2R2<G2R1<0; and 0<D1/D2<9.95, where G2R1 is the curvature radius of the subject-side surface of the second lens, G2R2 is the curvature radius of the image-side surface of the second lens, D1 is the diameter of the aperture stop, and D2 is the distance from the center of the aperture stop to the center of the subject-side surface of the first lens.

4 Claims, 10 Drawing Sheets

LENS SYSTEM HAVING WIDE-ANGLE, HIGH RESOLUTION, AND LARGE APERTURE

BACKGROUND

1. Technical Field

The present disclosure relates to lenses and, particularly, to a lens system having a wide field angle, high resolution, and large aperture.

2. Description of Related Art

Wide-angle, high-resolution, and large-aperture lenses are used by camera modules in instant messaging devices providing digital display. However, factors affecting field angle, resolution, and aperture of the lenses, such as, number and position of lenses employed, power distribution of the employed lenses, and shape of each employed lens, can complicate attempts at increasing the field angle, resolution, and aperture of the lenses. For example, increasing the field angle and aperture of the lenses may cause more field curvature, and thus the resolution of the lenses will suffer.

Therefore, it is desirable to provide a lens system which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
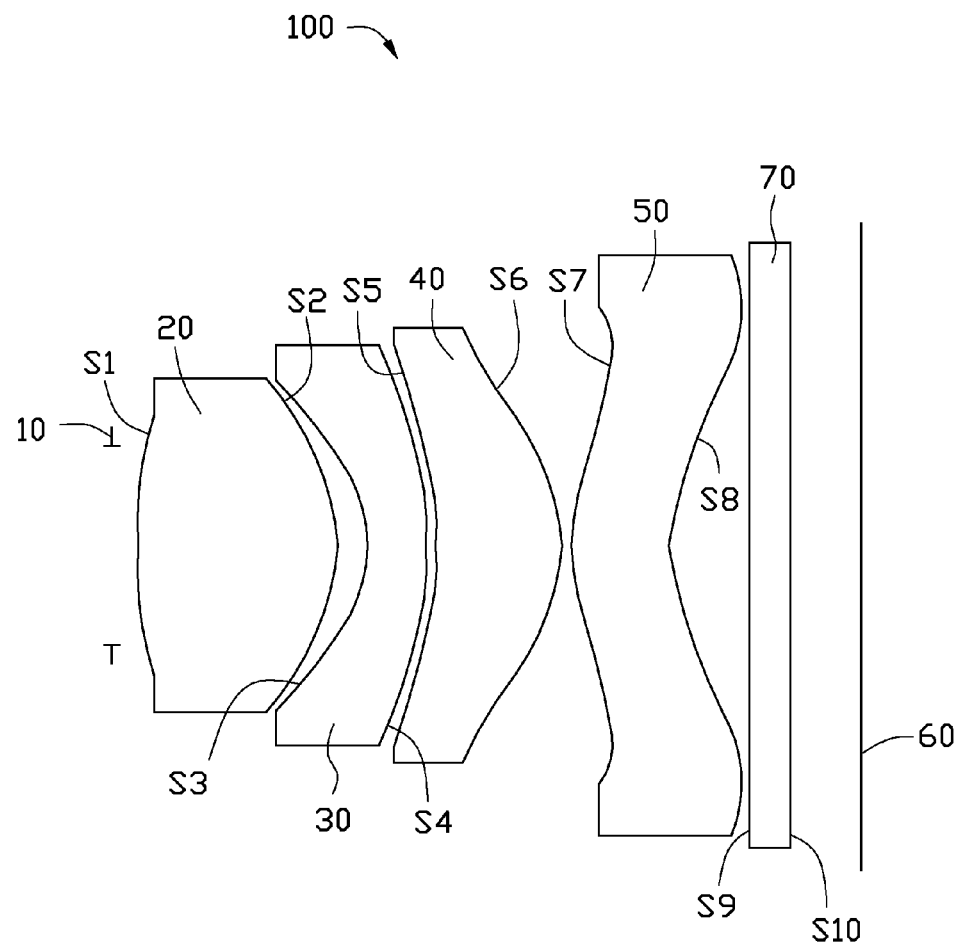
FIG. 1 is a schematic view of a lens system in accordance with a first embodiment.

Referring to FIG. 1, a lens system 100, according to a first embodiment, includes, in the order from the subject to the image side thereof, an aperture stop 10, a first lens 20 of positive refractive power, a second lens 30 of negative refractive power, a third lens 40 of positive refractive power, and a fourth lens 50 of negative refractive power.

The first lens 20 has a subject-side surface S1 convex towards the subject side of the lens system 100 and an image-side surface S2 convex towards the image side of the lens system 100. The second lens 30 has a subject-side surface S3 concave towards the image side of the lens system 100 and an image-side surface S4 convex towards the image side of the lens system 100. The third lens 40 includes a subject-side surface S5 concave towards the image side of the lens system 100 and an image-side surface S6 convex towards the image side of the lens system 100. The fourth lens 50 includes a subject-side surface S7 convex towards the subject side of the lens system 100 and an image-side surface S8 concave towards the subject side of the lens system 100.

When capturing an image, incident light rays enter the lens system 100, transmit through the aperture stop 10 and the four lenses 20-50, and reach an image plane (or surface) 60. In practice, an infrared cut filter 70 can be interposed between the lens system 100 and the image plane 60 to remove infrared to increase quality of the image.

To obtain a wide field angle, high resolution, and large aperture, the lens system 100 satisfies formulae: G2R2<G2R1<0; and 0<D1/D2<9.95, where G2R1 is the curvature radius of the subject-side surface S3 of the second lens 30, G2R2 is the curvature radius of the image-side surface S4 of the second lens 30, D1 is the diameter of the aperture stop 10, and D2 is the distance from the center of the aperture stop 10 to the center of the subject-side surface S1 of the first lens 20.

Satisfying the formula G2R2<G2R1<0, the lens system 100 obtains a wide field angle and large aperture. The formula 0<D1/D2<9.95 ensures that the lens system 100 has a relative high resolution.

To further correct aberration occurring therein to increase the resolution thereof, the lens system 100 further satisfies the formulae: G2R2/G3R1>1.26; G3R2/G2R1>1.05; 0.42<G2R1/F2<0.45; 1.52<G2R2/F2<1.73; G4R1>G4R2>0; and 0.53<G4R1/F<0.56, where G3R1 is the curvature radius of the subject-side surface S5 of the third lens 40, G3R2 is the curvature radius of the image-side surface S6 of the third lens 40, G4R1 is the curvature radius of the subject-side surface S7 of the fourth lens 50, G4R2 is the curvature radius of the image-side surface S8 of the fourth lens 50, F2 is the effective focal length of the second lens 30, and F is the effective focal length of the lens system 100.

To correct chromatic aberration occurring therein to increase the resolution thereof, the lens system 100 satisfies the formulae: Vd1>53; and Vd2<33, where Vd1 is the Abbe number of the first lens 20, and Vd2 is the Abbe number of the second lens 30.

The lenses 20-50 all have two aspherical surfaces (that is, a subject-side aspherical surface and an image-side aspherical surface) to efficiently correct aberrations occurring therein. The aspherical surface is shaped according to the formula:

$$x = \frac{ch^2}{1 + \sqrt{1-(k+1)c^2h^2}} + \sum A_i h^i,$$

where h is a height from the optical axis of the lens system 100 to the aspherical surface, c is a vertex curvature, k is a conic constant, and Ai are i-th order correction coefficients of the aspheric surface.

The following symbols are used:
F/No: F number;
2ω: field angle;
R: radius of curvature;
d: distance between surfaces on the optical axis of the lens system 100;
Nd: refractive index of lens of d light (wavelength: 587.6 nm); and
Vd: Abbe number of d light (wavelength: 587.6 nm).

In addition, the width of the aperture stop 10 can be omitted and the entire aperture stop 10 can be treated as a plane (or a surface) S0. The infrared cut filter 70 has a subject surface S9 and an image-side surface S10.

The lens system 100 of the first embodiment satisfies the tables 1-3.

TABLE 1

| Surface | R(mm) | D(mm) | Nd | Vd | k |
|---|---|---|---|---|---|
| S0 | infinity | 0.13 | — | — | — |
| S1 | 2.20 | 1.02 | 1.54 | 56.1 | −10.6809 |
| S2 | −1.02 | 0.16 | — | — | 0 |
| S3 | −0.67 | 0.30 | 1.63 | 23.4 | −0.5019 |
| S4 | −2.39 | 0.05 | — | — | 3.6355 |
| S5 | −1.89 | 0.65 | 1.53 | 56.0 | 0 |
| S6 | −0.77 | 0.05 | — | — | −0.8953 |
| S7 | 1.13 | 0.48 | 1.53 | 56.0 | −5.4234 |
| S8 | 0.67 | 0.42 | — | — | −3.2770 |
| S9 | infinity | 0.21 | 1.52 | 58.6 | — |
| S10 | infinity | 0.36 | — | — | — |
| Image plane 60 | — | — | — | — | — |

TABLE 2

| Surface | Aspherical coefficient |
|---|---|
| S1 | A4 = 0.0634, A6 = −0.0236, A8 = −0.4712, A10 = 0.6335 |
| S2 | A4 = 0.0339, A6 = 0.4368, A8 = −0.7526, A10 = 0.5575 |
| S3 | A4 = 0.0711, A6 = 1.1464, A8 = −1.5466, A10 = 1.1668 |
| S4 | A4 = −0.1297, A6 = 0.3096, A8 = −0.2111, A10 = 0.0816, A12 = −0.00045 |
| S5 | A4 = 0.0806, A6 = −0.0413, A8 = 0.0898, A10 = −0.0452 |
| S6 | A4 = 0.2024, A6 = 0.0368, A8 = −0.0363, A10 = 0.0153 |
| S7 | A4 = −0.0529, A6 = −0.0591, A8 = 0.0553, A10 = −0.0280 |
| S8 | A4 = −0.1549, A6 = 0.1043, A8 = −0.0478, A10 = 0.0068 |

TABLE 3

| F(mm) | F/No | 2ω |
|---|---|---|
| 2.10 | 2.05 | 74.85° |

Figure 2:
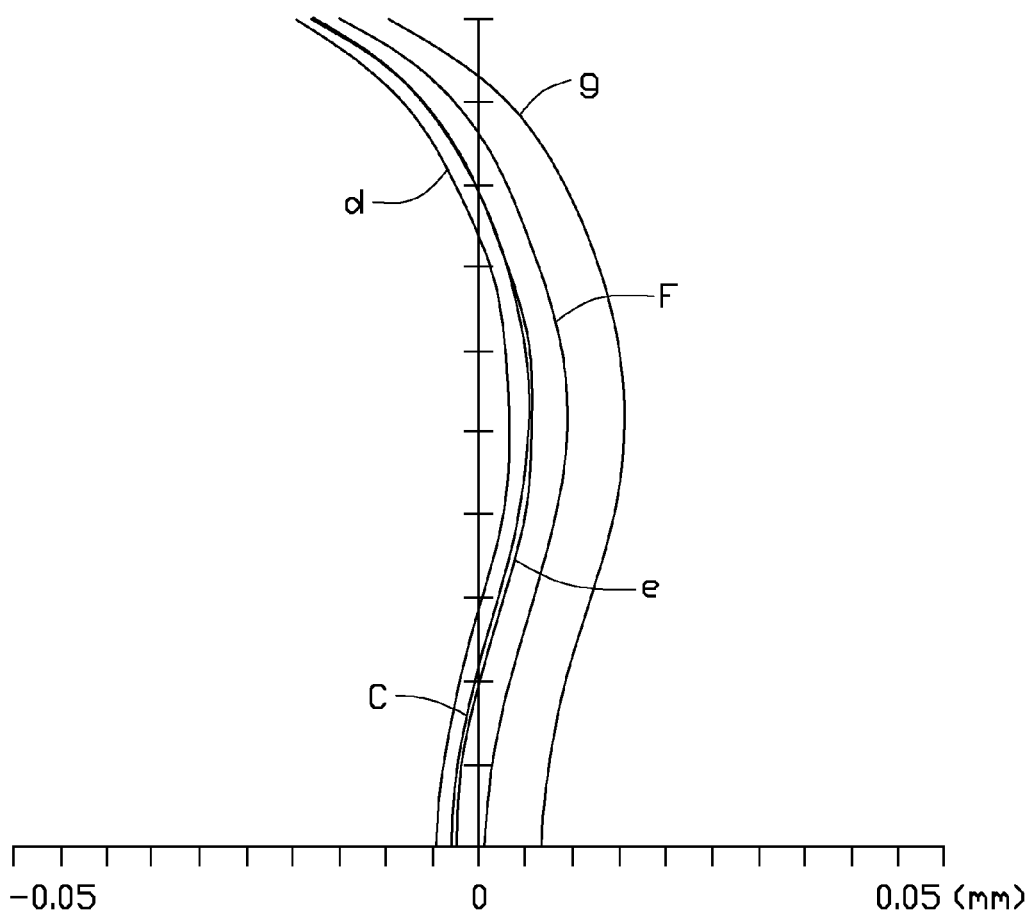
FIGS. 2-4 are graphs respectively showing spherical aberration, field curvature, and distortion in the lens system of FIG. 1.
Figure 3:
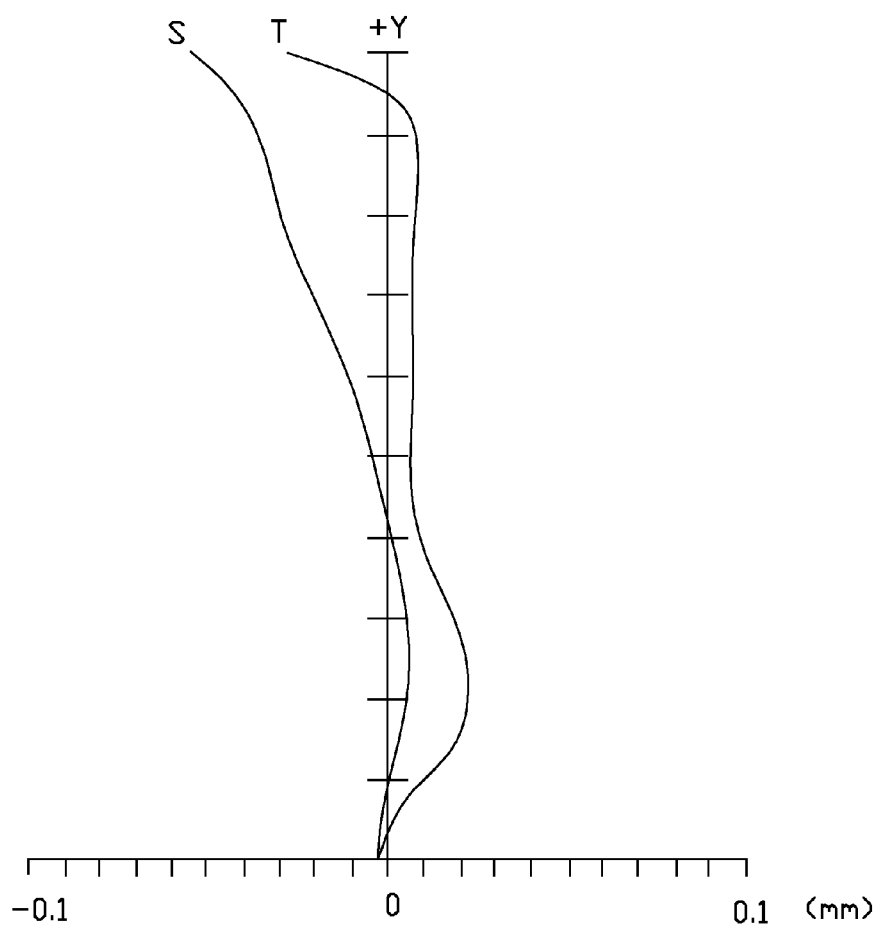
Figure 4:
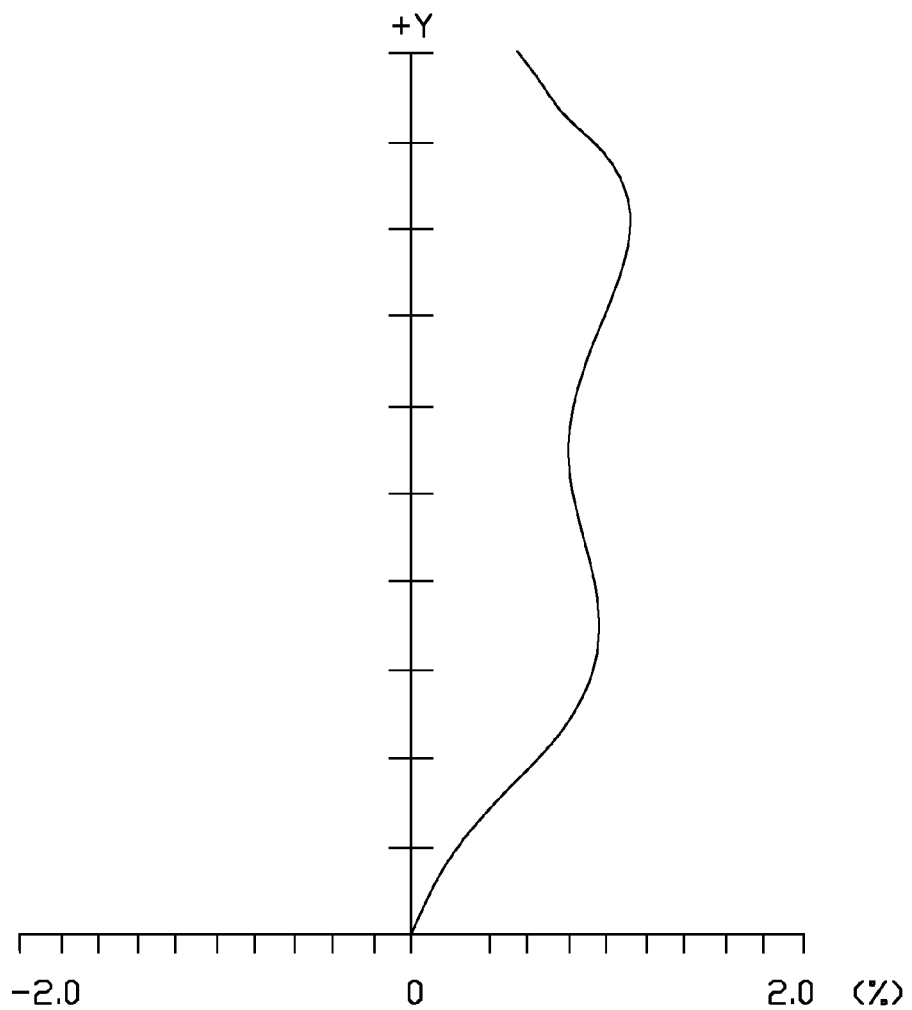
Figure 5:
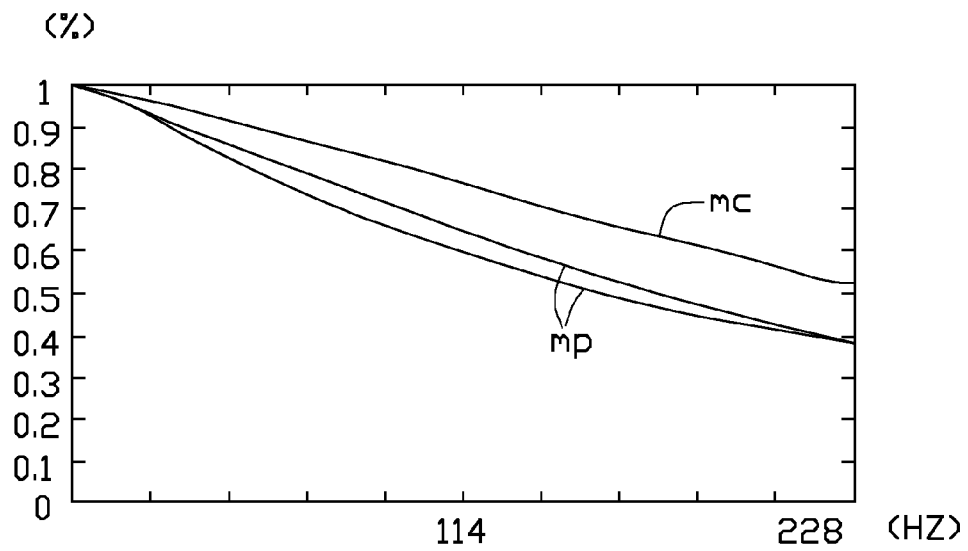
FIG. 5 is a graph showing modulation transfer function (MTF) characteristic curves of the lens system of FIG. 1.
Figure 6:
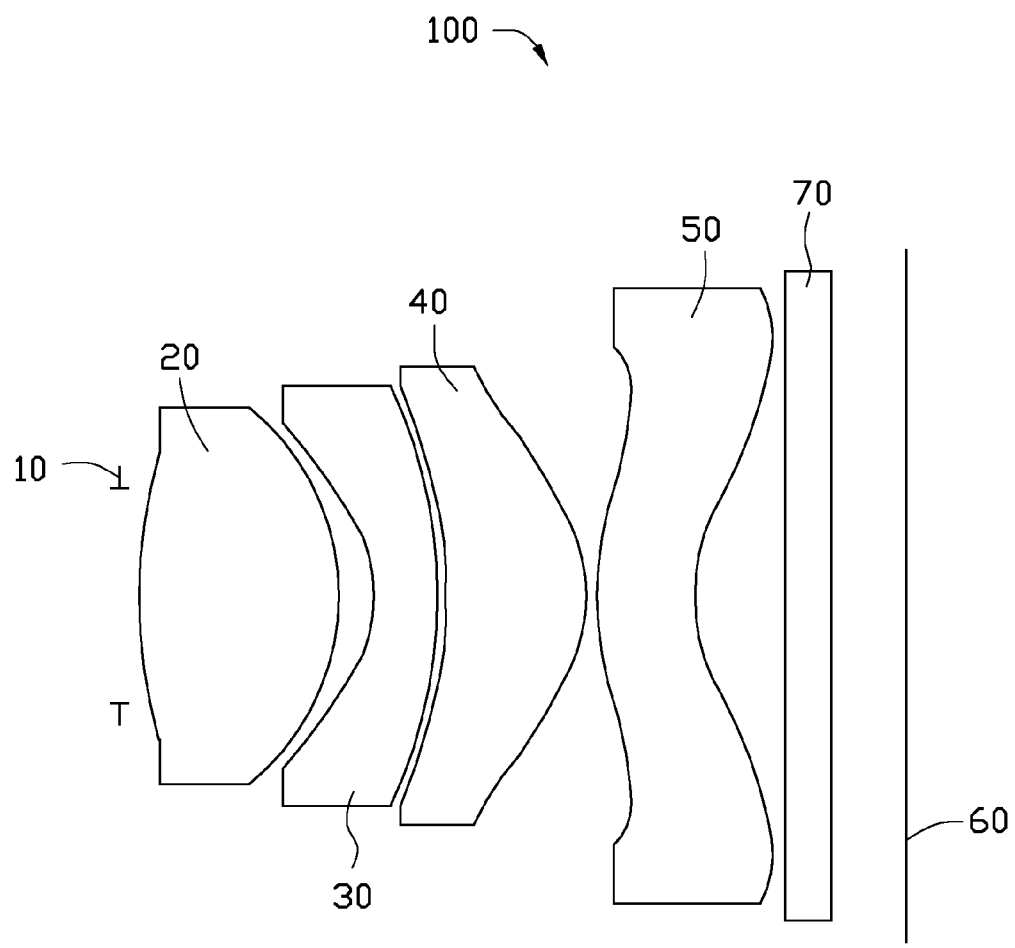
FIG. 6 is a schematic view of a lens system in accordance with a second embodiment.

As illustrated in FIG. 2, the curves g, F, e, d, and C are respective spherical aberration characteristic curves of g light (wavelength: 435.8 nm), F light (wavelength: 486.1 nm), d light (wavelength: 587.6 nm), e light (wavelength: 546.1 nm), and C light (wavelength: 656.3 nm) occurring in the lens system 100 of the first embodiment. Obviously, spherical aberration of visible light (400-700 nm) occurring in the lens system 100 of the first embodiment is in a range of: −0.025 mm~0.025 mm. In FIG. 3, the curves T and S are the tangential field curvature curve and the sagittal field curvature curve, respectively. Clearly, field curvature occurring in the lens system 100 of the first embodiment is limited to a range of: −0.1 mm~0.1 mm. In FIG. 4, distortion occurring in the lens system 100 of the first embodiment is limited within the range of: −2%~2%. In FIG. 5, the nyquist frequency is 228 lp/mm, the modulus of the optical transfer functions (OTF) of the 0.5 filed (shown as a curve mc) and 0.8 field (shown as a curve mp) respectively exceed 50% and 35%.

Referring to FIGS. 6-10, a lens system 100, according to a second embodiment, is essentially similar to that of the first embodiment but satisfies tables 4-6 instead of tables 1-3.

TABLE 4

| Surface | R(mm) | D(mm) | Nd | Vd | K |
|---|---|---|---|---|---|
| S0 | infinity | 0.10 | — | — | — |
| S1 | 2.16 | 0.94 | 1.54 | 56.1 | −4.9528 |
| S2 | −1.09 | 0.16 | — | — | 0 |
| S3 | −0.73 | 0.30 | 1.63 | 23.4 | −0.4449 |
| S4 | −2.81 | 0.05 | — | — | 5.6025 |
| S5 | −2.09 | 0.65 | 1.53 | 56.0 | 0 |
| S6 | −0.77 | 0.05 | — | — | −0.8711 |
| S7 | 1.16 | 0.47 | 1.53 | 56.0 | −4.5543 |
| S8 | 0.67 | 0.42 | — | — | −3.1010 |
| S9 | infinity | 0.21 | 1.52 | 58.6 | — |
| S10 | infinity | 0.37 | — | — | — |
| Image plane 60 | — | — | — | — | — |

TABLE 5

| Surface | Aspherical coefficient |
|---|---|
| S1 | A4 = 0.0337, A6 = −0.3378, A8 = 0.8674, A10 = −1.1926 |
| S2 | A4 = −0.0133, A6 = 0.2631, A8 = −0.2321, A10 = 0.0166 |
| S3 | A4 = 0.0234, A6 = 1.0304, A8 = −1.2914, A10 = 0.8898 |
| S4 | A4 = −0.1240, A6 = 0.3135, A8 = −0.2691, A10 = 0.1051 |
| S5 | A4 = 0.0308, A6 = −0.1017, A8 = 0.2053, A10 = −0.0960 |
| S6 | A4 = 0.2000, A6 = −0.0737, A8 = 0.0745, A10 = −0.0043 |
| S7 | A4 = −0.1278, A6 = −0.0222, A8 = 0.0558, A10 = −0.0368 |
| S8 | A4 = −0.1884, A6 = 0.1247, A8 = −0.0558, A10 = 0.0081 |

TABLE 3

| F(mm) | F/No | 2ω |
|---|---|---|
| 2.10 | 2.04 | 75.01° |

Figure 7:
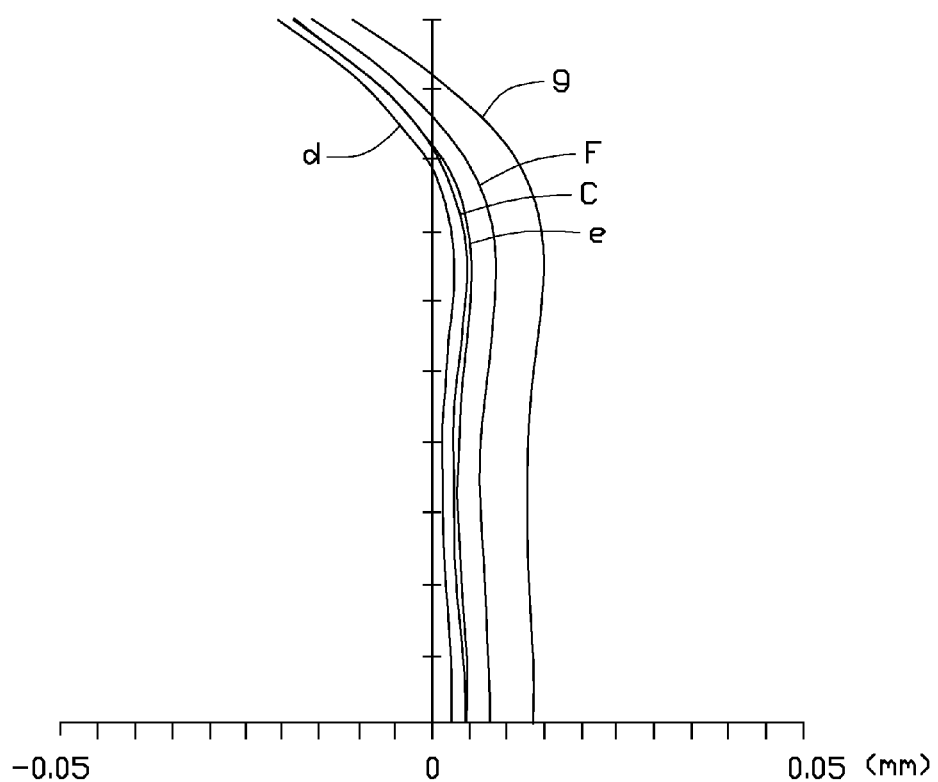
FIGS. 7-9 are graphs respectively showing spherical aberration, field curvature, and distortion occurring in the lens system of FIG. 6.
Figure 8:
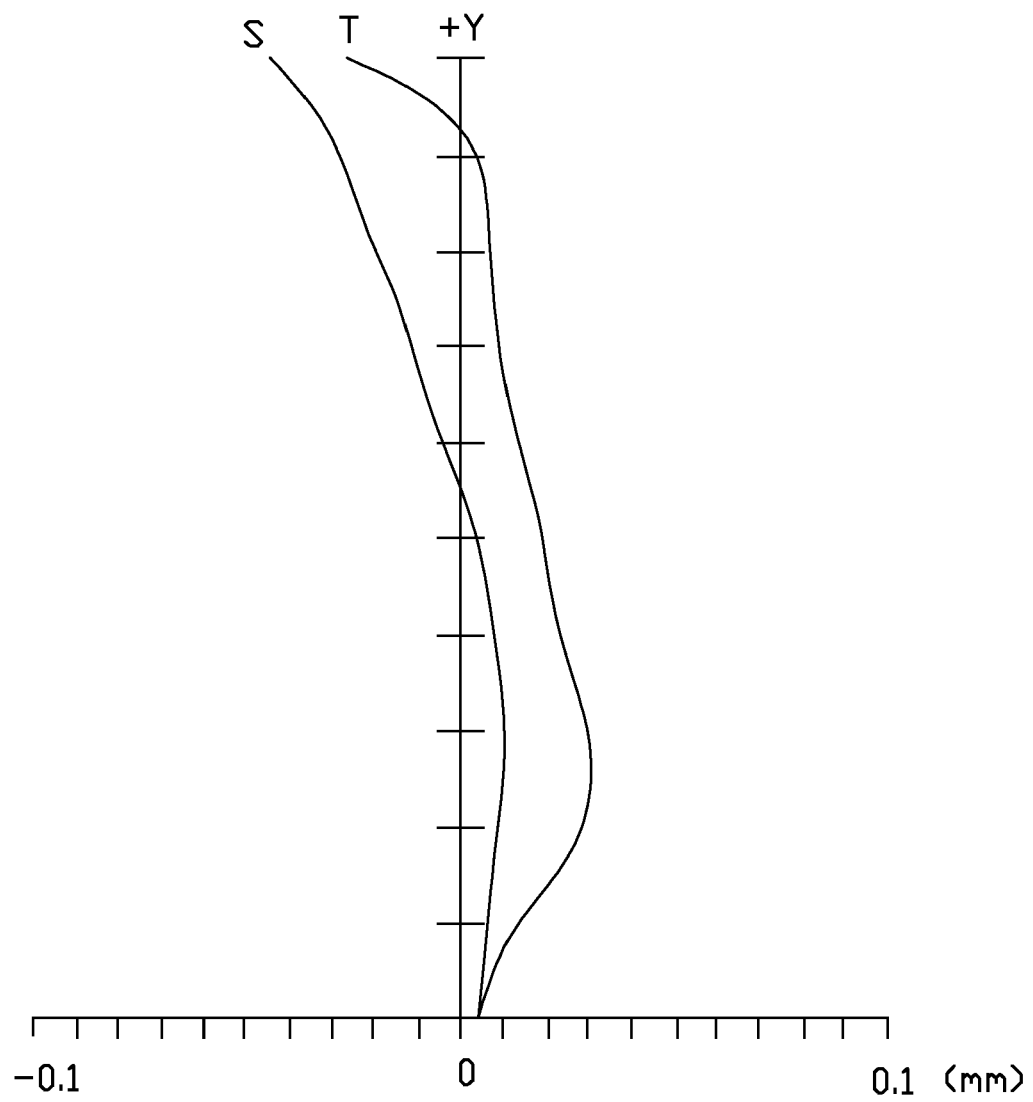
Figure 9:
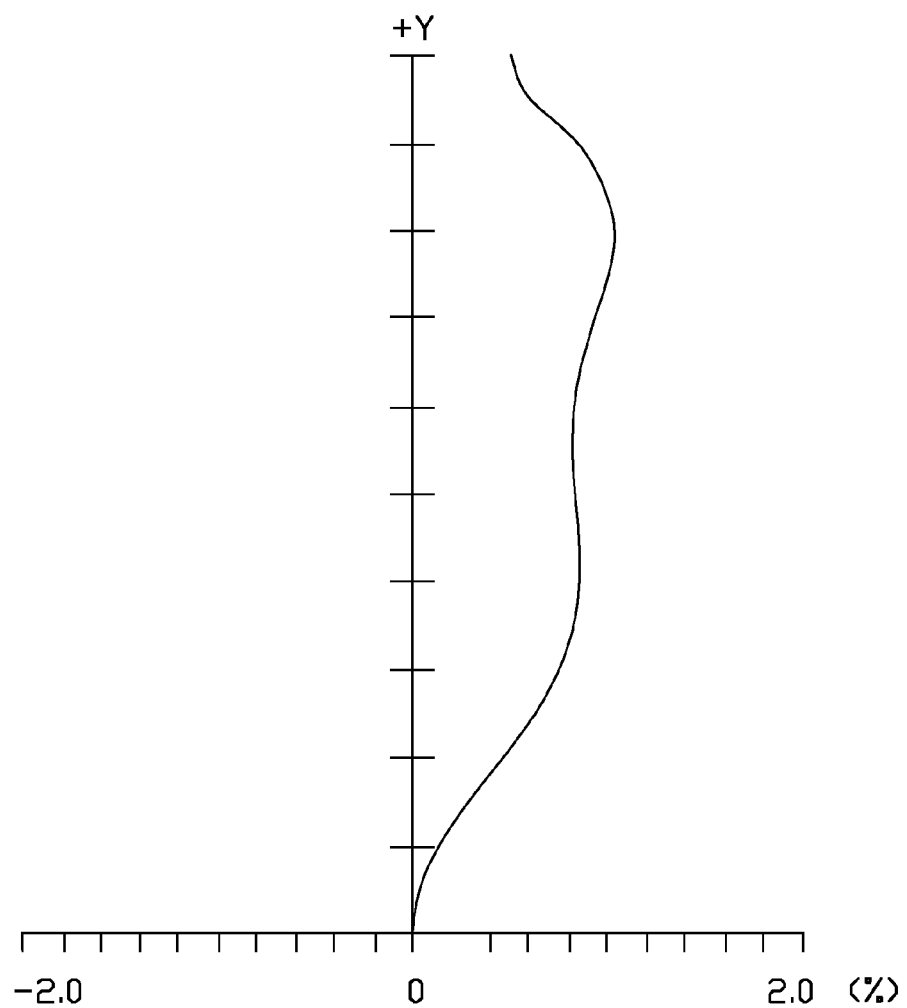
Figure 10:
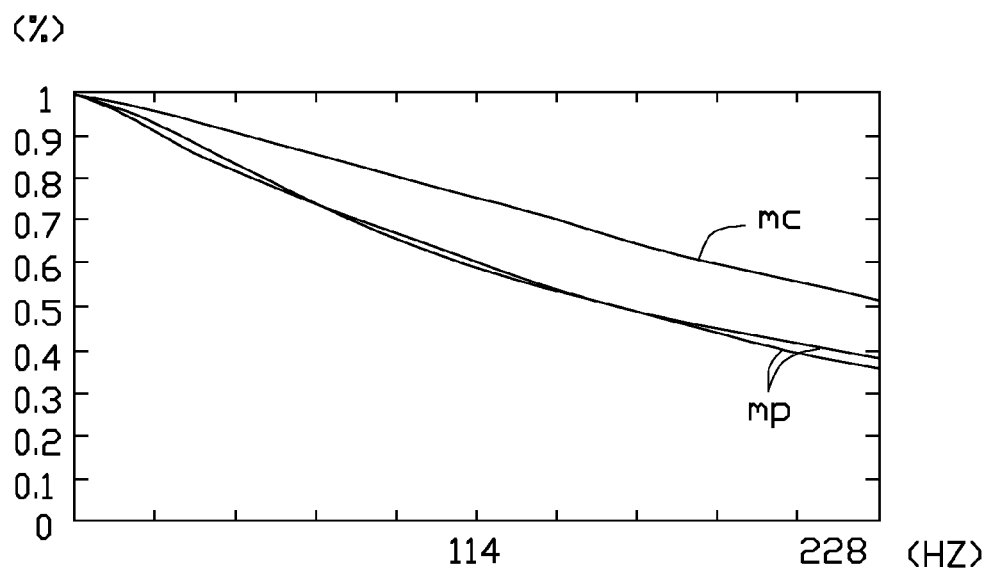
FIG. 10 is a graph showing MTF characteristic curves of the lens system of FIG. 6.

As illustrated in FIG. 7, spherical aberration of visible light (400-700 nm) occurring in the lens system 100 of the second embodiment is in a range of: −0.025 mm~0.025 mm. In FIG. 8, field curvature occurring in the lens system 100 of the second embodiment is limited to a range of: −0.1 mm~0.1 mm. In FIG. 9, distortion occurring in the lens system 100 of the second embodiment is limited within the range of: −2%~2%. In FIG. 10, the nyquist frequency is 228 lp/mm, the modulus of the optical transfer functions (OTF) of the 0.5 filed and 0.8 field respectively exceed 50% and 35%.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:
1. A lens system, in the order from the subject side to the image side thereof, comprising:
  an aperture stop;
  a first lens of positive refractive power having a subject-side surface and an image-side surface;
  a second lens of negative refractive power having a subject-side surface and an image-side surface;
  a third lens of positive refractive power having a subject-side surface and an image-side surface; and
  a fourth lens of negative refractive power having a subject-side surface and an image-side surface;
  the lens system satisfying the following formulae: G2R2<G2R1<0; and 0<D1/D2<9.95, where G2R1 is the curvature radius of the subject-side surface of the second lens, G2R2 is the curvature radius of the image-side surface of the second lens, D1 is the diameter of the aperture stop, and D2 is the distance from the center of the aperture stop to the center of the subject-side surface of the first lens;

the lens system further satisfying the following formulae: G2R2/G3R1>1.26; G3R2/G2R1>1.05; 0.42<G2R1/F2<0.45; 1.52<G2R2/F2<1.73; G4R1>G4R2>0; and 0.53<G4R1/F<0.56, where G3R1 is the curvature radius of the subject-side surface of the third lens, G3R2 is the curvature radius of the image-side surface of the third lens, G4R1 is the curvature radius of the subject-side surface of the fourth lens, G4R2 is the curvature radius of the image-side surface of the fourth lens, F2 is the effective focal length of the second lens, and F is the effective focal length of the lens system.

2. The lens system of claim 1, further satisfying the following formulae: Vd1>53; and Vd2<33, where Vd1 is the Abbe number of the first lens, and Vd2 is the Abbe number of the second lens.

3. The lens system of claim 1, wherein the first lens, the second lens, the third lens, and the fourth lens are aspherical lenses.

4. The lens system of claim 1, wherein the subject-side surface of the first lens is convex towards the subject side of the lens system, the image-side surface of the first lens is convex towards the image side of the lens system; the subject-side surface of the second lens is concave towards the image side of the lens system, the image-side surface of the second lens is convex towards the image side of the lens system; the subject-side surface of the third lens is concave towards the image side of the lens system, the image-side surface of the third lens is convex towards the image side of the lens system; the subject-side surface of the fourth lens is convex towards the subject side of the lens system, the image-side surface of the fourth lens is concave towards the subject side of the lens system.

* * * * *